US007249222B1

United States Patent
Bellis et al.

(10) Patent No.: US 7,249,222 B1
(45) Date of Patent: Jul. 24, 2007

(54) PREFETCHING DATA BASED ON PREDETERMINED CRITERIA

(75) Inventors: Andrew Bellis, Guildford (GB); Andrew Draper, Chesham (GB)

(73) Assignee: Altera Corporation, San Jose, CA (US)

( * ) Notice: Subject to any disclaimer, the term of this patent is extended or adjusted under 35 U.S.C. 154(b) by 306 days.

(21) Appl. No.: 10/840,183

(22) Filed: May 5, 2004

(51) Int. Cl.
G06F 12/00 (2006.01)
(52) U.S. Cl. .......................... 711/137; 711/213; 326/39
(58) Field of Classification Search ..................... None
See application file for complete search history.

(56) References Cited

U.S. PATENT DOCUMENTS 6,877,070 B2 * 4/2005 Espeseth et al. ............ 711/137
7,035,979 B2 * 4/2006 Azevedo et al. ............ 711/137

* cited by examiner

Primary Examiner—T Nguyen
(74) Attorney, Agent, or Firm—Townsend and Townsend and Crew LLP

(57) ABSTRACT

A memory controller can perform prefetching, in a way which increases the efficiency with which data can be read from an external memory. More specifically, the memory controller operates such that it performs prefetching only under certain conditions, which are chosen such that there is a high probability that the data requested in the prefetching operation will be the data which is next required. The memory controller may be implemented in a programmable logic device (PLD), and be optimized for retrieving data from an external flash or SRAM memory device, which is used for storing configuration data for the PLD. By examining a read request, it is possible to determine whether a prefetching operation can be performed, with a high probability that it will be the required data which is prefetched.

21 Claims, 4 Drawing Sheets

PREFETCHING DATA BASED ON PREDETERMINED CRITERIA

TECHNICAL FIELD OF THE INVENTION

This invention relates to a memory interface, and in particular to a memory interface which can be incorporated into an integrated circuit, in order to control accesses from the integrated circuit to an external memory device.

BACKGROUND OF THE INVENTION

Memory devices are provided in different types, and are usually classified according to the technology which they use in order to store data. For example, there exist Dynamic RAM (Random Access Memory), or DRAM, devices, including SDRAM (Synchronous DRAM) devices. Another increasingly common category of memory device is SRAM (Static RAM) devices, and yet another category is made up of flash memory devices.

The operation of these devices is such that, when data is to be read out of the device, a command is sent from the requesting device, or, more specifically, from a memory controller within the requesting device.

The requested data is typically broken up into blocks of a particular length, and a separate access request is sent for each of the blocks to be requested.

In addition to the time required to read data out of the external memory device, there is also a certain amount of processing time, required to deal with each read access request.

Thus, the total time required in order to complete the read operation is longer than the time which is actually taken to read the data out of the memory device.

One attempt to mitigate this inefficiency, which has been used in the case of SDRAM devices at least, is to use a technique known as 'prefetching'. That is, even before a memory controller receives a read access request from a bus master device, it begins the operation of reading data from the external memory device.

This has the result that, provided that the memory controller then receives a request for the data which it has begun to read, it will be able to process that request more quickly than it would otherwise be able to do. However, it has the disadvantage that, if the next read access request, which is received by the memory controller, requests data which is not the data which the memory controller has already begun to read in the prefetching operation, the result may be that the requested data is actually retrieved more slowly than would have been the case without prefetching.

SUMMARY OF THE INVENTION

The present invention therefore provides a memory controller, which can perform prefetching, in a way which increases the efficiency with which data can be read from the external memory. More specifically, the memory controller operates such that it performs prefetching only under certain conditions, which are chosen such that there is a high probability that the data requested in the prefetching operation will be the data which is next required.

In a preferred embodiment of the invention, the memory controller is implemented in a programmable logic device, and is optimised for retrieving data from an external flash or SRAM memory device.

These memory devices are often used for storing configuration data for programmable logic devices. In such circumstances, it is often necessary to read configuration data from the external memory device into the programmable logic device.

By examining a read request, it is possible to determine whether a prefetching operation can be performed, with a high probability that it will be the required data which is prefetched.

In the preferred embodiment of the invention, therefore, the memory controller examines the form of a read access request and, if certain conditions are met, then, when that read access is completed, it prefetches further data from the external memory device.

When a programmable logic device retrieves configuration data from an external memory device, it usually retrieves the data in the form of a series of defined length bursts. Accordingly, therefore, in the preferred embodiments of the present invention, the memory controller performs a prefetching operation, only when the previous read access was in form of a defined length burst.

According to another aspect of the present invention, there is provided a programmable logic device, having a memory controller of this type.

DETAILED DESCRIPTION OF PREFERRED EMBODIMENTS

Figure 1:
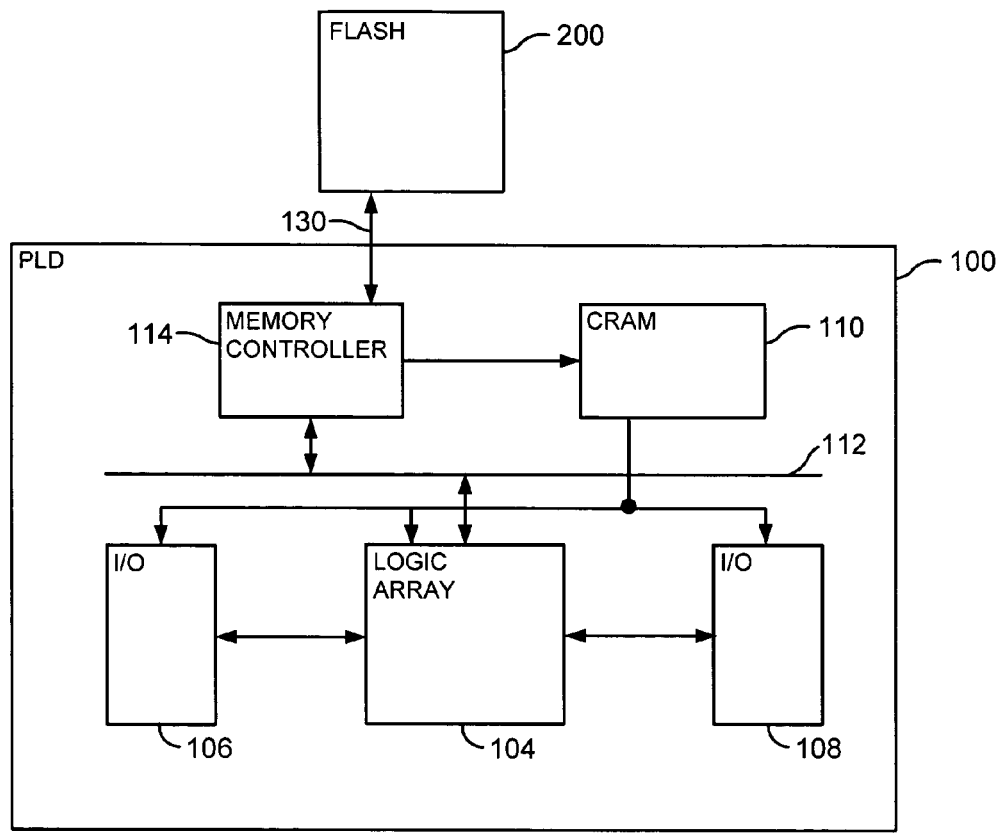
FIG. 1 is a block schematic diagram of a programmable logic device, according to the present invention, and an associated external memory device.

FIG. 1 is a block schematic diagram of a system operating in accordance with the present invention, comprising a programmable logic device 100, and an external memory device 200. In this illustrated embodiment of the invention, the external memory device 200 is a flash memory, and more specifically a synchronous flash memory. The advantages of the present invention are particularly noticeable when the external memory device is a synchronous flash memory device, because data can be read out of such devices at a very high rate, which means that the processing delay between read accesses is particularly noticeable, and hence that any reduction in this processing delay is also particularly noticeable. However, the external memory device 200 could equally well be an asynchronous flash memory, or an asynchronous SRAM (Static RAM) memory device, and could in fact be any form of memory device.

The general form of the programmable logic device (PLD) 100 is generally conventional, and will therefore be described here, only to the extent required for an understanding of the present invention.

The programmable logic device is based around a gate array 104, which is made up of a large number of programmable logic elements. The gate array 104 is connected to input/output devices 106, 108. The logic elements making up the gate array 104, and their interconnections, and the connections between the logic elements and the input/output devices 106,108, are all programmable, on the basis of configuration data, so that the programmable logic device 100 performs a specific intended function.

The configuration data is stored within the programmable logic device 100 in a configuration RAM (CRAM) 110, which has dedicated connections to supply configuration data to the gate array 104 and the input/output devices 106,108.

The programmable logic device 100 includes a memory controller 114, which is connected to the logic array 104 by means of an internal bus 112. In the preferred embodiment, the bus 112 operates in accordance with the AHB protocol, although any bus structure can be used.

The memory controller 114 also has a connection to the configuration RAM (CRAM) 110.

The memory controller 114 can be used to control all memory accesses originating within the programmable logic device 100, and may therefore be connected to multiple external memory devices. However, as shown in FIG. 1, the memory controller is connected only to the external flash memory 200, by means of a memory bus 130. The external flash memory 200 is used to store the configuration data, which is downloaded into the configuration RAM 110 of the programmable logic device 100 when the device is initialised, as well as other data.

As mentioned above, the memory controller 114 can be used to control all memory accesses originating within the programmable logic device 100, and therefore performs numerous functions relating to the processing of access requests, and typically has separate interfaces for each external memory device which may be connected to it. Again, the memory controller 114 will be described here, only to the extent required for an understanding of the present invention.

In one preferred embodiment of the invention, the programmable logic device 100 also includes an embedded processor, which is integrated with the programmable logic device 100 in a single device. In such a device, the memory controller 114 may form part of the hard-wired section of the device, with the embedded processor.

Figure 2:
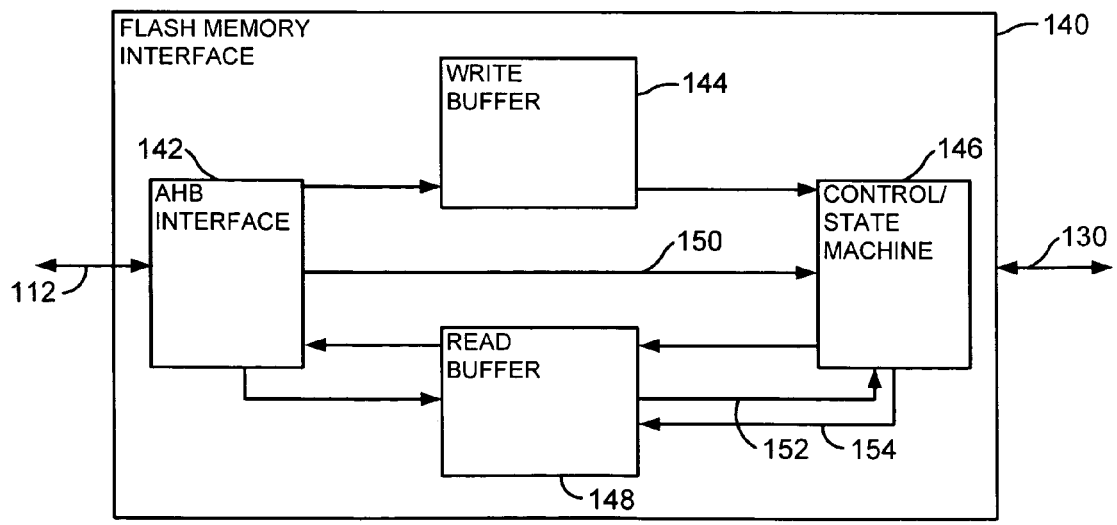
FIG. 2 is an enlarged block schematic diagram of a memory controller according to the present invention, forming part of the programmable logic device of FIG. 1.

Specifically, FIG. 2 is a block schematic diagram showing the form of the interface 140, within the memory controller 114, which is provided for connection to an external flash memory device. As mentioned above, the invention can be applied also to interfaces which are optimised for connection to other forms of memory device. Again, the flash memory interface 140 will be described here, only to the extent required for an understanding of the present invention.

Flash memory access requests are received over the AHB bus 112 at an AHB interface 142. In the case of a write access request, the data to be written into the external flash memory is stored in a write and command buffer 144, and a control state machine 146 determines how that data is to be transferred over the memory bus 130 to be stored in the external memory device.

In the case of a read access request, the access request is posted into the write and command buffer 144, to be executed by the control state machine 146. Control information is also passed to the control state machine 146 over a line 150, and the requested data is transferred over the memory bus 130 from the external memory device to be stored in a read buffer 148. The data can then be transferred through the AHB interface 142, and over the AHB bus 112 to the requesting device. The AHB interface 142 can send control signals to the read buffer 148, requesting it to read data, or to send data to the AHB interface. The control state machine 146 can receive information from the read buffer 148 over a control line 152, and it can pass control signals to the read buffer 148 over a control line 154.

The present invention is particularly concerned with the handling of read access requests in the control state machine 146, and FIGS. 3(*a*) and 3(*b*) are flow charts which illustrate one part of the way in which the control state machine 146 operates on receipt of a read access request.

FIG. 3(*a*) shows a first part of the process, in which a prefetching operation may be started, while FIG. 3(*b*) shows a second part of the process, in which a prefetching operation may be terminated.

In FIG. 3(*a*), at step 302, the system is initially idle. At step 304, a read request is received from the AHB interface 142. This is processed in the normal way and, at step 306, the read access is initiated, and data begins to be read from the external memory device. While the read access is beginning, in step 308, the control state machine 146 determines whether a prefetching operation should be started. Specifically, the control state machine 146 applies criteria to determine whether the received read access request is such that there is a high probability that a prefetching operation can retrieve data which will in fact be requested. If a prefetching operation retrieves data which is subsequently requested, then the prefetching can improve the efficiency of the operation, by allowing that data to be returned to the requesting device more quickly than would otherwise be the case. However, if a prefetching operation retrieves data which is not subsequently requested, then the prefetching can worsen the efficiency of the operation, because the data which is in fact requested is returned to the requesting device more slowly than would otherwise be the case.

According to the present invention, therefore, the control state machine 146 tests a received read access request, and only performs a prefetching operation if the received read access request is such that there is a high probability that a prefetching operation can retrieve data which will in fact be requested.

In this illustrated embodiment of the invention, a particular aim is to increase the efficiency with which configuration data can be retrieved from an external memory device into the CRAM 110 of the PLD 100. The configuration data is typically retrieved by means of a series of successive defined length bursts with consecutive addresses. That is, in general terms, data can be retrieved from the external memory device in bursts which have defined lengths or variable lengths, and can be retrieved from any desired memory location. However, the knowledge about the way in which configuration data is typically stored, and retrieved, means that prefetching can be used to improve the efficiency with which the configuration data is retrieved.

Thus, in step 308 of the process of FIG. 3(*a*), the control state machine 146 tests whether the received read access request is a defined length burst. More specifically, in a preferred embodiment of the invention, the available defined length bursts are an 8 beat incrementing burst, an 8 beat wrapping burst, a 16 beat incrementing burst, and a 16 beat wrapping burst. Therefore, in step 308, the control state machine 146 tests whether the received read access request is one of these defined length bursts.

If the received read access request is not one of these defined length bursts then, in effect, the control state machine 146 determines that it cannot predict with the required degree of reliability what the succeeding read access request is likely to be, and hence that prefetching cannot be performed with the required high probability that the prefetching operation will retrieve the data which will be required next. In that case, the process passes to step 310 in which, once the pending read access has been completed, the system returns to its idle state to await a new access request.

If the control state machine determines in step 308 that the received read access request is of the correct burst type, the process passes instead to step 312, in which the control state machine sets a flag indicating that prefetching is enabled, and it prepares a prefetch read operation. Specifically, the control state machine 146 constructs a prefetch read which assumes that the next received read access request will be identical to the pending read access request. That is, the prefetch read relates to the same chip select as the pending read access request, and its start address is the next available memory address after the last memory address. The chip select and the address define the memory location, within a block of memory, from which data is to be retrieved. Thus, the definition of the prefetch read assumes that the next read access request is likely to relate to data stored immediately after the pending read access request, and constructs the prefetch read on that basis.

In step 314 of the process, the pending read access request completes, and the process passes to step 316. In step 316, the control state machine 146 applies a further test to determine whether to proceed with the prefetching operation. Specifically, the control state machine 146 tests whether there is sufficient space available in the read buffer 148.

In this illustrated embodiment of the invention, the read buffer 148 has a size of 128 bytes. However, it will be appreciated that the read buffer 148 may have any convenient size.

The read buffer 148 evaluates the read buffer occupancy counter, and flags to the control state machine 146 over the line 152 whether or not there is 64 bytes of space available in the read buffer. In step 316, the control state machine 146 reads this flag. If there is less than 64 bytes of space available in the read buffer, the process passes to step 318, in which the system does not perform a prefetch operation, but goes into an idle state. If more space becomes available in the read buffer 148, the process can then return to step 316 and resume operation. That is, the prefetch read operation can continue if there is at least 64 bytes of space available in the read buffer.

If the control state machine 146 determines in step 316 that there is at least 64 bytes of space available in the read buffer, the process passes to step 320, in which the prefetch read operation is started. That is, data is read from the external memory device 200, from the chip select and starting address specified in the constructed prefetch read access.

Continually, while the prefetch read is being performed, the process performs step 322, in which it is determined whether the 64 byte threshold in the read buffer has been reached in the prefetch operation. If this 64-byte boundary has not been reached, the process returns to step 320, and the prefetch operation continues. However, if this 64-byte boundary has been reached, the process returns to step 318, in which the control state machine 146 again determines whether there is at least 64 bytes of space available in the read buffer, with the results of this test being as previously described. Thus, if there is less than 64 bytes of available space, the process goes into an idle state, while, if there is at least 64 bytes of available space, a further prefetch operation is started, and a further 64 bytes of data are read.

If the available buffer space becomes less than 64 bytes in the middle of a burst, then the burst is terminated, and it resumes from the correct address once more than 64 bytes of space again become available in the read buffer.

It will be appreciated that the numerical values given in this description are purely illustrative, and that other values could equally well be chosen. The test performed in step 316 must determine whether there is sufficient space in the read buffer to contain the data retrieved in step 320 before the boundary test in step 322 is satisfied. However, it is a matter of design choice that this should be 64 bytes, compared with a buffer size of 128 bytes.

Figure 3A:
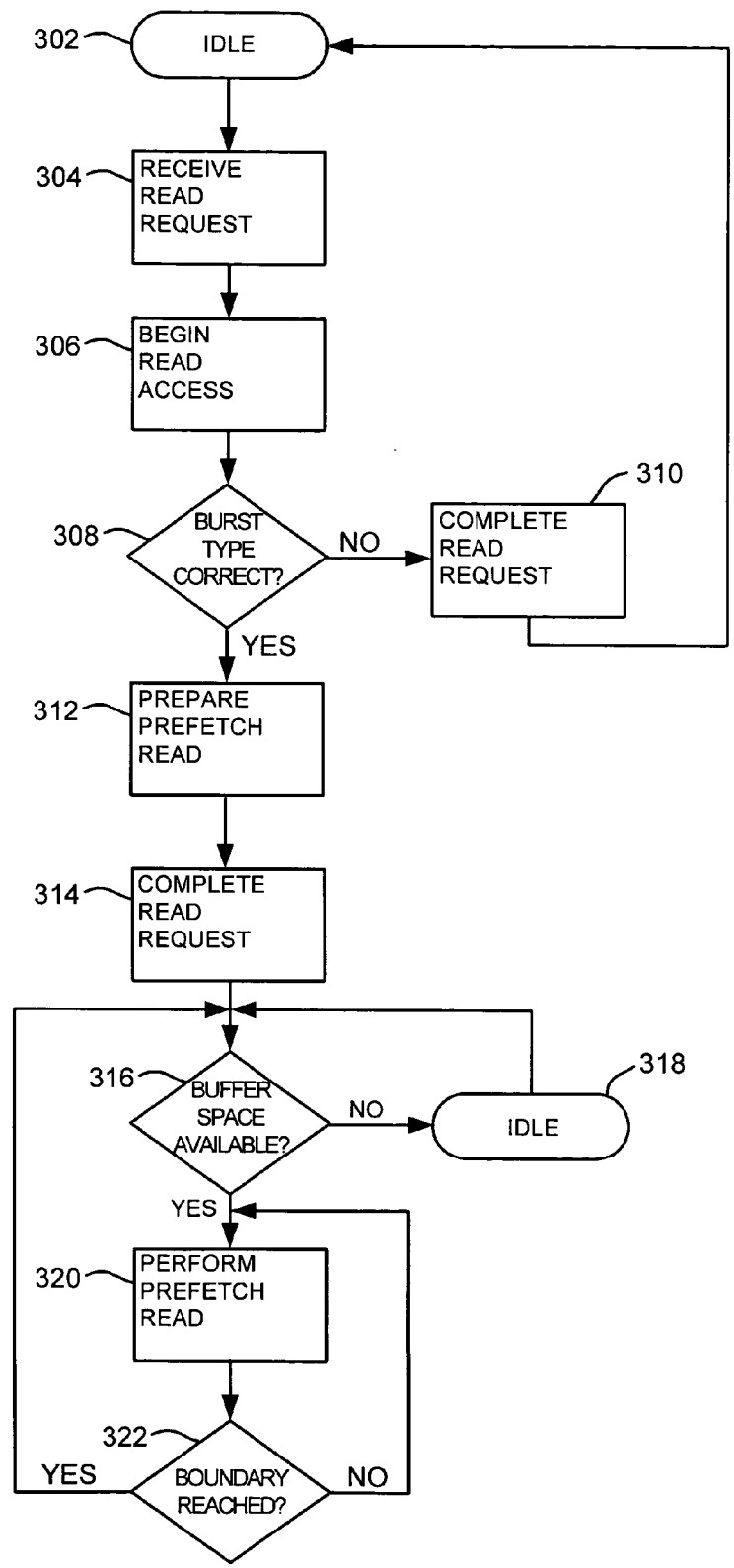
FIGS. 3(*a*) and 3(*b*) are flow charts, illustrating a method in accordance with the present invention.
Figure 3B:
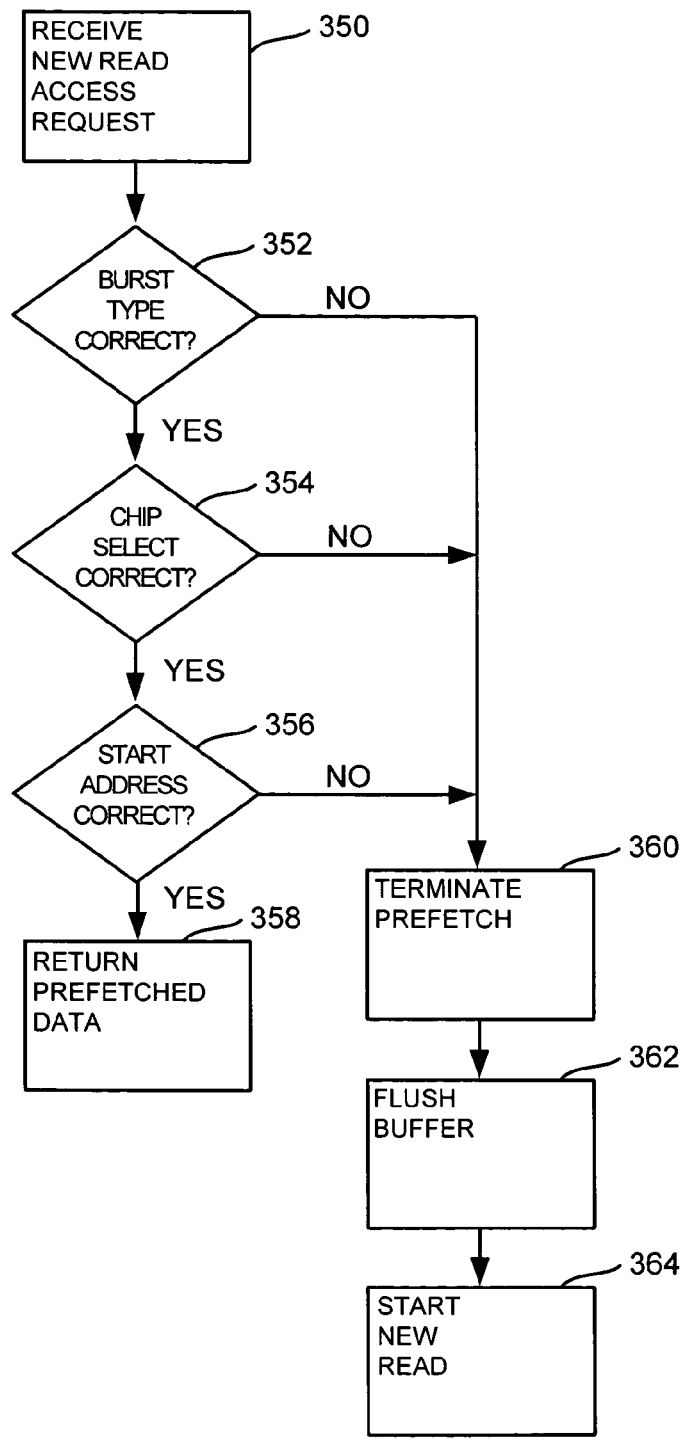

FIG. 3(b) is a flow chart which shows the process which is performed when a new read access request at a time while a prefetch operation is current, that is, at any point in steps 316, 318, 320 or 322 in the process as illustrated in FIG. 3(a). In step 350, the new read access request is received. It is then tested whether the data which has been retrieved in the prefetch operation is in fact the data which is requested in the new read access request.

That is, in step 352, it is determined whether the newly received read access request is of the correct burst type. In step 308 above, it was tested whether the pending read access request related to one of a number of predetermined available defined length bursts, namely an 8 beat incrementing burst, an 8 beat wrapping burst, a 16 beat incrementing burst, and a 16 beat wrapping burst.

In step 352, it is now tested whether the newly received read access request relates to one of that same group of predetermined available defined length bursts, namely an 8 beat incrementing burst, an 8 beat wrapping burst, a 16 beat incrementing burst, and a 16 beat wrapping burst. It should be noted however that the control state machine 146 only determines whether the newly received read access request relates to one of that same group of predetermined available defined length bursts, it does not test whether it relates to the same specific type of burst as the read access request which caused the prefetch operation to be initiated.

If it is determined in step 352 that the newly received read access request relates to one of the allowed burst types, the process passes to step 354, in which it is determined whether the newly received read access request relates to the same chip select as the read access request which caused the prefetch operation to be initiated. If so, the process passes to step 356, in which it is determined whether the newly received read access request has a start address which allows the prefetched data to be used. If the newly received read access request is a fixed length incrementing burst, the start address must equal the start address of the prefetch read. If the newly received read access request is a fixed length wrapping burst, the aligned address of this wrapping burst must equal the start address of the prefetch read.

Thus, steps 354 and 356 together determine whether the prefetched data is in fact the data which is requested in the newly received read access request. If so, the process passes to step 358, in which the prefeteched data is returned from the read buffer to the requesting device. Steps 352, 354 and 356 are performed in the AHB interface 142, and if it is determined in step 352, 354 or 356 that the newly received read access request is not of an allowed burst type, or does not relate to the prefeteched data, the process passes to step 360, in which the AHB interface 142 sends a termination command to the control state machine 146 over the line 150.

In response, the control state machine 146 terminates the pending prefetch operation, then, in step 362, sends a flush command to the read buffer 148 over the line 154. Once the read buffer has been flushed, the process passes to step 364, in which the read access, defined by the newly received read access request, is performed.

Thus, there is described a method for performing a prefetch operation, only in a situation in which there is a high probability that the prefetch operation will retrieve the data which will actually be requested in a subsequently received read access request.

FIG. 4 is a timing diagram, showing the time saving which can be achieved by means of the prefeteching operation, and the time penalty which is incurred if a prefetching operation is performed inappropriately.

Figure 4A:
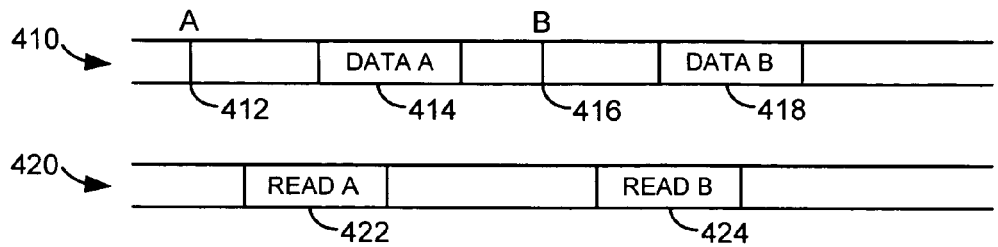
FIGS. 4(*a*), 4(*b*) and 4(*c*) are a series of timing diagrams, showing the sequence of event during successive read accesses in the absence of prefetching, when the correct data is prefeteched, and when incorrect data is prefetched, respectively.

FIG. 4(a) shows the situation when prefetching is not enabled. Line 410 shows the situation at the AHB interface 142, while line 420 shows the situation on the memory bus 130. At a time point 412, the AHB interface receives a request for data A. After a time delay, the data A is read out of the memory during time period 422, and returned to the requesting device during time period 414. At a time point 416, the AHB interface receives a request for data B. After a time delay, the data B is read out of the memory during time period 424, and returned to the requesting device during time period 418.

Figure 4B:
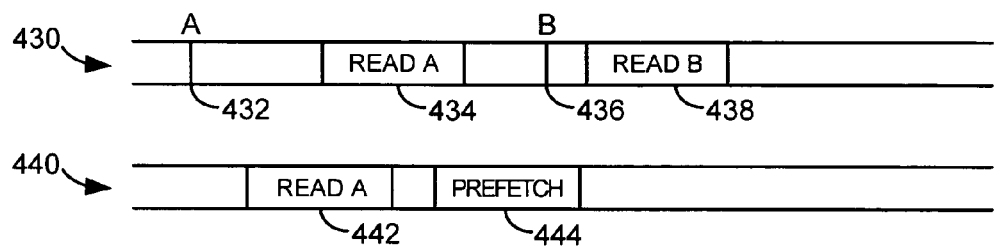

FIG. 4(b) shows a first situation when prefetching is enabled. Line 430 shows the situation at the AHB interface 142, while line 440 shows the situation on the memory bus 130. At a time point 432, the AHB interface receives a request for data A. After a time delay, the data A is read out of the memory during time period 442, and returned to the requesting device during time period 434. With a minimal delay after the end of period 442, the memory controller initiates a prefetching operation, and data is prefetched into the memory controller during time period 444. At a time point 436, the AHB interface receives a request for data B. In this case, the data B is the prefetched data, and so it can be read out of the read buffer in the memory controller, and returned to the requesting device during time period 438. Because the requested data B is already stored in the read buffer, there is minimal delay between the receipt of the request for data B and the return of the data B to the requesting device.

Figure 4C:
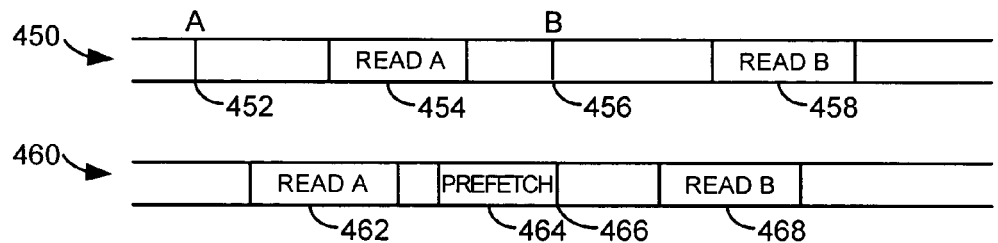

FIG. 4(c) shows a second situation when prefetching is enabled. Line 450 shows the situation at the AHB interface 142, while line 460 shows the situation on the memory bus 130. At a time point 452, the AHB interface receives a request for data A. After a time delay, the data A is read out of the memory during time period 462, and returned to the requesting device during time period 454. With a minimal delay after the end of period 462, the memory controller initiates a prefetching operation, and data is prefetched into the memory controller during time period 464. At a time point 456, the AHB interface receives a request for data B. In this case, the data B is not the prefetched data. Therefore, the memory controller terminates the prefetching operation at point 466, flushes the read buffer in the memory controller, and only then is able to read the requested data B during time period 468. This data B is then returned to the requesting device during time period 458.

Thus, because of the need to terminate the prefetching operation and flush the read buffer before beginning to read the requested data B, there is a longer delay between the receipt of the request for data B and the return of the data B to the requesting device in this case, than there was without prefetching, in the case illustrated in FIG. 4(a).

Figure 5:
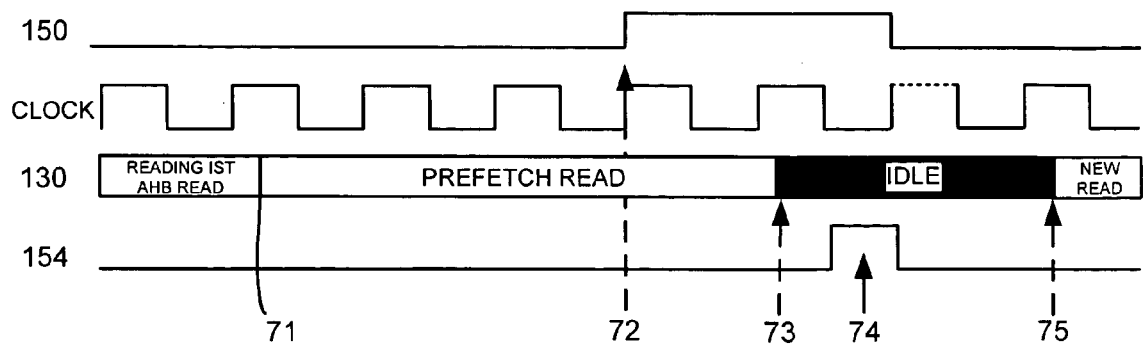
FIG. 5 is a further timing diagram, showing the timing of various signals during a prefetching operation.

FIG. 5 is a further form of timing diagram, showing some of the signals sent to and from the control state machine block 146 in the memory controller.

Specifically, FIG. 5 shows: in the line marked 150, the signal on the line 150 from the AHB interface 142 to the control and state machine 146; the clock signal within the interface 140; in the line marked 130, the status of the memory bus 130; and, in the line marked 154, the signal on the line 154 from the control and state machine 146 to the read buffer 148.

Thus, initially in FIG. 5, data is being read from the external memory, in accordance with a first read request received on the AHB bus 112. Further, a prefetch read has been defined.

At time T1, the read is completed, and the prefetch read operation starts. Subsequently, a further read access request is received on the AHB bus 112. As described above, the AHB interface 142 tests whether the requested data is the data which is being prefetched. In this case, it is determined by the AHB interface 142 that the requested data is not the data which is being prefetched. Therefore, at time T2, the AHB interface 142 causes a termination signal to appear on the line 150 to the control and state machine 146. In response, at time T3, the control and state machine 146 stops the prefetch read. Further, at time T4, the control and state machine 146 causes a flush signal to appear on the line 154 to the read buffer 148.

Only at time T5, when the flush operation is complete, and after a period when the memory bus 130 is idle, can the new requested read operation begin on the memory bus 130.

FIG. 5 therefore further illustrates the additional delay which is introduced by a prefetching operation, when the prefetched data is not the data which is in fact next requested.

This further illustrates the advantages of the present invention, in which steps are taken to perform a prefetch operation, only at times when it is probable that the data which is next requested will be the prefetched data.

The invention claimed is:

1. In a memory controller, for use in a programmable logic device for connection to an external memory device, a method of performing a prefetch operation, the method comprising:
   testing whether a present read access request is such that there is a high probability that said present read access request relates to configuration data for said programmable logic device; and
   performing a prefetch operation if it is determined that there is a high probability that said present read access request relates to configuration data for said programmable logic device.

2. A method as claimed in claim 1, wherein the step of testing whether a present read access request is such that there is a high probability that said present read
   access request relates to configuration data for said programmable logic device comprises:
   determining whether the present read access request is of a burst type from a predetermined group of suitable burst types, selected from the possible burst types.

3. A method as claimed in claim 2, wherein the predetermined group of suitable burst types comprises defined length accesses.

4. A method as claimed in claim 2, further comprising, if a further read access request is received while a prefetch operation is in progress:
   determining whether said further read access request is of a burst type from said predetermined group of suitable burst types; and terminating said prefetch operation if said further read access request is not of a burst type from said predetermined group of suitable burst types.

5. A method as claimed in claim 4, further comprising, if a further read access request is received while a prefetch operation is in progress, and if said further read access request is not of a burst type from said predetermined group of suitable burst types:
flushing prefetched data from a read buffer, and subsequently performing the operation requested in said further read access request.

6. A method as claimed in claim 4, further comprising continuing said prefetch operation, and returning prefetched data to a requesting device, if a start address of said further read access request corresponds to a start address of said prefetch operation which is in progress.

7. A method as claimed in claim 1, further comprising, if it is determined that a prefetch operation is to be performed:
when the present read access request is completed, testing whether a read buffer contains an amount of unused space exceeding a predetermined threshold; and
performing the prefetch operation if it determined that the read buffer contains an amount of unused space exceeding a predetermined threshold.

8. A method as claimed in claim 7, further comprising prefetching a predetermined amount of data.

9. A method as claimed in claim 8, wherein said predetermined threshold for said amount of unused space in the read buffer corresponds to said predetermined amount of data.

10. A method as claimed in claim 8, further comprising, after prefetching said predetermined amount of data:
testing whether said read buffer still contains an amount of unused space exceeding said predetermined threshold; and
continuing a prefetch operation if it determined that the read buffer still contains an amount of unused space exceeding said predetermined threshold.

11. A method as claimed in claim 10, further comprising prefetching a further predetermined amount of data.

12. A programmable logic device, comprising:
a configuration memory, for storing configuration data; and
a memory controller, for connection to an external memory device, wherein, when said memory controller receives a present read access request, said memory controller retrieves the data requested in said present read access request, and determines whether said present read access request is such that there is a high probability that said present read access request relates to configuration data for said programmable logic device; and
said memory controller performs a prefetch operation after completing retrieval of the data requested in said present read access request if it is determined that there is a high probability that said present read access request relates to configuration data for said programmable logic device.

13. A programmable logic device as claimed in claim 12, wherein said memory controller determines whether said present read access request is of a defined length burst.

14. A programmable logic device as claimed in claim 12, wherein said memory controller performs a prefetch operation after completing retrieval of the data requested in said present read access request if it is determined that a read buffer contains an amount of unused space exceeding a predetermined threshold.

15. A programmable logic device as claimed in claim 12 wherein, if a further read access request is received while a prefetch operation is in progress, said memory controller returns prefetched data to a requesting device if:
the further read access request is of a defined length burst;
the further read access request corresponds to a same chip select of said prefetch operation which is in progress; and
the start address of said further read access request corresponds to a start address of said prefetch operation which is in progress.

16. An electronic system, comprising a programmable logic device and an external memory device, wherein said programmable logic device comprises:
a configuration memory, for storing configuration data; and
a memory controller, for connection to said external memory device, wherein, when said memory controller receives a present read access request, said memory controller retrieves the data requested in said present read access request, and determines whether said present read access request is such that there is a high probability that said present read access request relates to configuration data for said programmable logic device; and
said memory controller performs a prefetch operation after completing retrieval of the data requested in said present read access request if it is determined that there is a high probability that said present read access request relates to configuration data for said programmable logic device.

17. An electronic system as claimed in claim 16, wherein said external memory device comprises a flash memory device.

18. An electronic system as claimed in claim 16, wherein said external memory device comprises a SRAM device.

19. An electronic system as claimed in claim 16, wherein said memory controller determines whether said present read access request is of a defined length burst.

20. An electronic system as claimed in claim 16, wherein said memory controller performs a prefetch operation after completing retrieval of the data requested in said present read access request if it is determined that that buffer space is available.

21. An electronic system as claimed, in claim 16, wherein, if a further read access request is received while a prefetch operation is in progress, said memory controller returns prefetched data to a requesting device if:
the further read access request is of a defined length burst;
the further read access request corresponds to a same chip select of said prefetch operation which is in progress; and
the start address of said further read access request corresponds to a start address of said prefetch operation which is in progress.

* * * * *